United States Patent [19]

Patrick

[11] Patent Number: 4,651,887
[45] Date of Patent: Mar. 24, 1987

[54] SPILL CATCH PAN

[75] Inventor: Roy G. Patrick, Catlettsburg, Ky.

[73] Assignee: Ashland Oil, Inc., Ashland, Ky.

[21] Appl. No.: 817,022

[22] Filed: Jan. 8, 1986

[51] Int. Cl.⁴ .......................... F16N 3/00; E04B 7/16; B65B 39/00
[52] U.S. Cl. ...................... 220/1 C; 52/72; 141/87; 141/98; 184/1.5; 220/219; 220/255
[58] Field of Search ............... 220/1 R, 1 C, 219, 255; 184/1.5, 106; 52/64, 66, 71, 72, 302, 303; 141/87, 98

[56] References Cited

U.S. PATENT DOCUMENTS

| | | |
|---|---|---|
| D. 263,055 | 2/1982 | Perry .................................. 220/1 C |
| 1,330,303 | 2/1920 | Cleveland ......................... 220/1 C |
| 1,658,044 | 2/1928 | Fagan . |
| 1,796,168 | 3/1931 | Stair . |
| 1,837,916 | 12/1931 | Michelman . |
| 1,896,610 | 2/1933 | Counce ............................... 184/1.5 |
| 1,941,162 | 12/1933 | Brown .................................... 52/71 |
| 3,270,801 | 9/1966 | Richter . |
| 3,390,484 | 7/1968 | Gillespie . |
| 3,531,851 | 10/1970 | Douglas ................................. 52/71 |
| 3,938,621 | 2/1976 | Bobbitt ............................. 184/1.5 |
| 3,991,900 | 11/1976 | Burke ................................. 220/219 |
| 4,000,588 | 1/1977 | Van der Lely ....................... 52/71 |

Primary Examiner—George E. Lowrance
Attorney, Agent, or Firm—Mueller and Smith

[57] ABSTRACT

Disclosed is a spill pan which is ideally suited for installation between the rails of a rail siding used for loading and unloading liquid chemicals and solvents. The spill catch pan is designed to catch any inadvertent liquids which are discharged during the loading or unloading process. Such spill catch pan comprises a pair of substantially-planar, rigid segments which are pivotally hinged together at one side of each segment. The first segment also is pivotally mounted at the side opposite its said one side while the second segment is spring-biasedly mounted at the side opposite its said one side. The segments contain a hole penetrating therethrough which is located where the segments are pivotally hinged together. A pair of side walls are mounted adjacent said segments transverse to the hinges. The segments are mounted over a spill retainer at the first segment side opposite pivotal mount and at said second segment spring-biased mount such that said pair of segments are non-planar.

14 Claims, 3 Drawing Figures

SPILL CATCH PAN

BACKGROUND OF THE INVENTION

The present invention involves the unloading of liquid chemicals and solvents, for example, from rail cars, and more particularly to a spill catch pan useful therein.

During the process of unloading rail cars of liquid chemicals, solvents, petroleum, and the like, small spills inevitably occur when hoses are disconnected. Such spills occur even though the drain valve is in a closed position. Evironmentally, such spills are not acceptable. Heretofore, previous catch pans have had sliding or removable covers. The sliding covers typically do not operate properly and the removable covers often become lost.

A variety of cover plates have been proposed in different fields of art. For example, U.S. Pat. No. 1,658,044 relates to a covered drain pit and grease pack wherein a centrally-hinged cover plate is counter weighted for opening of the cover plate to expose the grease pit. U.S. Pat. No. 1,796,168 relates to covers for storage bins which covers are mounted on tracks for accessing the storage bins. U.S. Pat. No. 1,837,916 relates to a weatherproof sidewalk door which is mounted flush with the sidewalk and which has a centrally-disposed channel for catching rain water which can flow through the opening that exists between the two rigid doors. U.S. Pat. No. 3,270,801 relates to a device which automatically holds back rigid cardboard doors so that the workers can operate safely around them.

Even with such proposals, there exists a need for an improved spill catch pan cover. The present invention is directed to such need.

BROAD STATEMENT OF THE INVENTION

The present invention is directed to a spill catch pan which is useful in the process of unloading rail cars. The spill catch pan comprises a pair of substantially-planar, rigid segments which are pivotally hinged together at one side of each segment. The first segment is pivotally mounted at the side opposite said one side while the second segment is spring-biasedly mounted at the side opposite said one side. Said segments contain a hole which penetrates therethrough. This hole is located where the segments are pivotally hinged together. A pair of side walls are mounted adjacent said segments transverse to said one sides and said opposite sides of said segments. The segments are mounted over a spill retainer at the first segment side opposite pivotal mount and at said second segment spring-biased mount such that said pair of segments are non-planar.

The method for using the spill catch pan involves displacing the central hinge so that the "gable roof" configuration of the segments is converted to a V-shaped configuration. The spring biasing enables the segments to retain their inverted V or gable roof configuration when the catch pan is not in use, and the V-shaped configuration when the catch pan is in use. In use, inadvertent spills run down the segments to the centrally-disposed hole and into the spill retainer.

Advantages of the present invention include a spill catch pan which is permanently mounted over the spill retainer. This means that the catch pan segments will not become lost in use. A further advantage is a spill catch pan which is extremely easy to operate. A further advantage is a spill catch pan which is efficient in operation. These and other advantages will become readily apparent to those skilled in the art based upon the disclosure contained herein.

The drawings will be described in greater detail in connection with the description of the invention which follows.

DETAILED DESCRIPTION OF THE INVENTION

The inventive spill catch pan has been designed for installation between the rails of a rail siding used for loading and unloading liquid chemicals, solvents, and like material (spill source). The pan is installed in a position such that it will be directly underneath the rail car unloading nozzle. The discharge of the catch pan simply can be a holding pit or tank which can be pumped down periodically or can be contemporaneously piped to a waste collection system for handling. The inventive catch pan is activated from the storage or inverted V position to a use or V position simply by pushing down on handles which are conveniently provided. The springs hold the spill catch pan in either position and an adjustable nut can fix the position precisely. Upon removal of the cap from the discharge nozzle of the rail car, some leakage inevitably occurs even though the valve is closed. This spill or leakage will fall onto the spill catch pan and into the spill retainer. A tank car fitting and hose is connected to the discharge nozzle and the unloading proceeds. Any subsequent leakage that occurs at the nozzle during the unloading process similarly will drip onto the spill catch pan. After the unloading has been completed, residue from the hose can be drained onto the pan and the inventive pan re-established into the storage position simply by lifting on the handles. The small access opening in the catch pan will permit some rain to enter into the spill retainer, though most rain and incidental moisture will be deflected down the sides of the spill catch pan for reducing the volume of unwanted liquid entering the spill retainer system.

Figure 1:
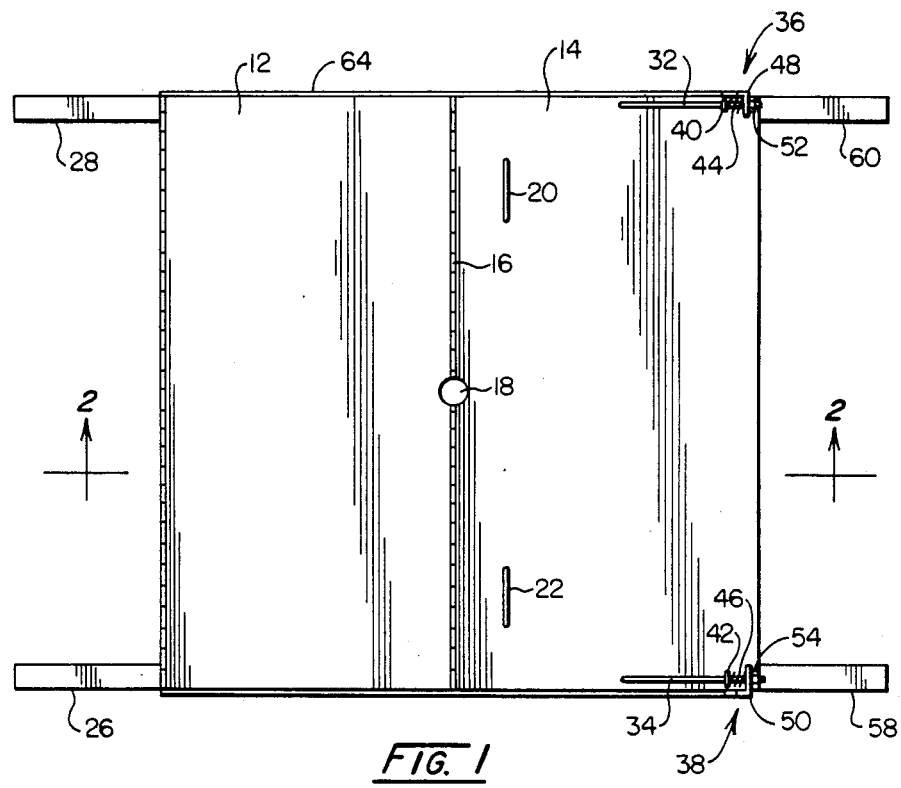
FIG. 1 is an overhead plan view of the spill catch pan of the present invention.

With respect to the specifics of the spill catch pan, reference is made to FIG. 1 which provides an overhead plan view of the inventive spill catch pan which is composed primarily of first segment 12 and second segment 14 which are pivotally hinged at one side of each segment, such hinge arrangement depicted at 16. Hinge assembly 16 may be a continuous hinge running the length of segments 12 and 14 or individual hinges may be utilized as is necessary, desirable, or convenient in conventional fashion. Hole 18 penetrates through segments 12 and 14 and is located where the segments are pivotally hinged. Segments 12 and 14 preferably are rectangular, but this configuration is not a limitation as other configurations certainly would function in accordance with the precepts of the present invention. The same is true of circular hole 18 which may be rectangular or any other shape. Hole 18 desirably is designed to be about 2 inches in diameter with the overall dimensions of segments 12 and 14 together being 4 feet on each side for placement between the rails of a rail siding. Handles 20 and 22 are located on segment 14 for actuating the spill catch pan. Segments 12 and 14 are substantially-planar and are rigid. For strength, erosion and corrosion resistance, materials of construction for segments 12 and 14 comprehend metal, though reinforced plastics may find use on occasion.

Figure 2:
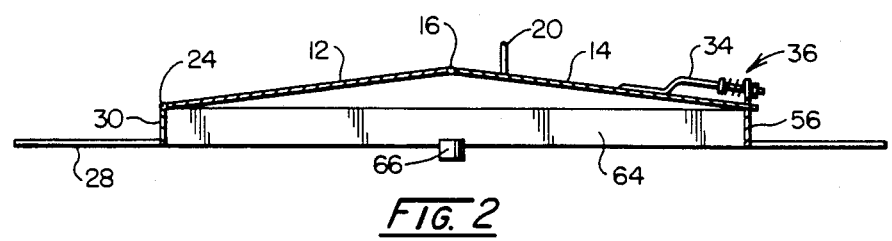
FIG. 2 is a section taken along line 2—2 of the spill catch pan depicted at FIG. 1 wherein the spill catch pan is in the up or non-use position.
Figure 3:
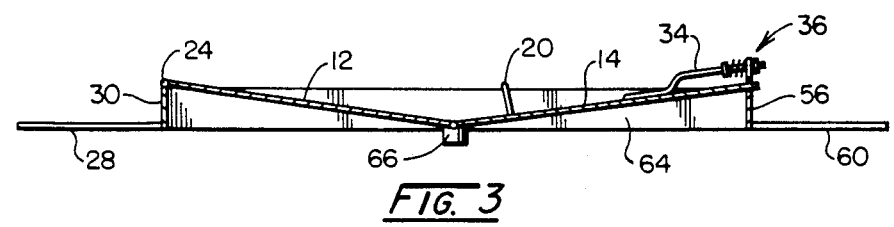
FIG. 3 is a sectional view like that depicted at FIG. 2, except that the spill catch pan is in its down or use position.

Segment 12 is pivotally hinged at the side opposite the one side at which segment 12 is pivotally hinged to segment 14. Hinge assembly 24 may be the same as hinge assembly 16 or may be different. Hinge assembly 24 is secured to wall 30 (see FIGS. 2 and 3) and wall 30, in turn, is secured to straps 26 and 28 which are designed for anchoring to rail ties. Wall 30 and straps 26 and 28 form a frame to which segment 12 is mounted. Other frame designs could be used.

Segment 14 is connected via rods 32 and 34 to spring-biasing assemblies 36 and 38, respectively. These spring assemblies are composed of welded washers 40 and 42, springs 44 and 46, angle plates 48 and 50, and nuts 52 and 54. Nuts 52 and 54 control the tension of springs 44 and 46. Rods 32 and 34 are retained by side wall 56 which, in turn, is connected to straps 58 and 60 which also are designed for anchoring to rail ties. Side wall 56 and straps 58 and 60 form the frame to which segment 14 is mounted.

Side walls 62 and 64 run transverse to hinge assemblies 16 and 24 and assist in confining spills to be retained on segments 12 and 14. Finally, coupling 66 is located underneath hole 18 and is connected to a waste collection system for handling spills which enter the spill catch pan of the present invention. Coupling 66 could be replaced by a pit or similar arrangement as a spill retainer for retaining spills.

As noted above, it will be appreciated that during non-use periods, the spill catch pan is retained in the use or inverted V configuration by the force exerted by spring assemblies 36 and 38. Simply by pushing down on segment 12 or segment 14, springs 44 and 46 are compressed to accommodate the movement of segments 12 and 14 to the position depicted in FIG. 3 for use of the spill catch pan wherein the spill catch pan is in a V configuration. Again, gravity and the force exerted by spring assemblies 36 and 38 ensure that the segments are retained in the use position. When the unloading procedure has been completed, the storage position depicted at FIG. 2 can be re-established simply by lifting on handles 20 and 22. Thus, it will be appreciated that the spill catch pan of the present invention is extremely efficient and reliable in its design and use. The spill catch pan of the present invention could be composed of additional segments operating in the same fashion as described herein, though economy would dictate that a pair of segments be utilized. The remaining components of the spill catch pan should be composed of material like that for segments 12 and 14 described above. Thus, steel, especially galvanized steel will find use in manufacturing the spill catch pan of the present invention. Finally, while segments 12 and 14 are rigid, some bowing in segments 12 and 14 may be desirable to ensure that any spills which fall onto the spill catch pan will run down to the V created at hinge assembly 16 and thence to hole 18.

What is claimed is:

1. A spill catch pan which comprises:
   a pair of substantially-planar, rigid segments which are pivotally hinged together at one side of each segment, the first segment being pivotally mounted to a first frame at the side opposite its said one side, the second segment being spring-biasedly mounted to a second frame at the side opposite its said one side, said segments containing a hole penetrating therethrough which is located where said segments are pivotally hinged together,
   a pair of side walls which are mounted adjacent said segments transverse to said one sides and said opposite sides of said segments, said segments being mounted over a spill retainer and being mounted to said frames such that said pair of segments are non-planar.
2. The spill catch pan of claim 1 wherein said rigid segments are rectangular in shape.
3. The spill catch pan of claim 1 wherein at least one of said segments contains a handle affixed to its upper surface.
4. The spill catch pan of claim 1 wherein said pivotal hinge for said pair of rigid segments is a continuous hinge which runs the length of said one side of each segment.
5. The spill catch pan of claim 1 wherein said pivotal mounting for said first frame is a continuous hinge which runs the length of said first frame opposite side.
6. The spill catch pan of claim 1 wherein said first frame and said second frame each comprise a vertical wall which is connected to a pair of straps which straps are adapted to be mounted to railroad ties.
7. The spill catch pan of claim 1 which is constructed from metal.
8. The spill catch pan of claim 1 wherein said first frame and said second frame each are mounted to railroad ties located between railroad tracks.
9. The spill catch pan of claim 1 wherein said segments are mounted such that they form an inverted V when said spill catch pan is in its storage position and form a V when said spill catch pan is in its use position.
10. A method for catching spills which comprises:
    placing a spill source over a spill catch pan, said spill catch pan comprising a pair of substantially-planar, rigid segments which are pivotally hinged together at one side of each segment, the first segment being pivotally mounted to a first frame at the side opposite its said one side, the second segment being spring-biasedly mounted to a second frame at the side opposite its said one side, said segments containing a hole penetrating therethrough which is located where said segments are pivotally hinged together, a pair of side walls which are mounted adjacent said segments transverse to said one sides and said opposite sides of said segments, said segments being mounted over a spill retainer and being mounted to said frames such that said pair of segments form an inverted V when said spill catch pan is in its storage position and form a V when said spill catch pan is in its use position;
    displacing said segments where they are pivotally hinged together so that said spill catch pan is moved from its storage position to its use position;
    actuating said spill source; and
    at the termination of said spill source actuating, displacing said segments where they are pivotally hinged together to move said spill catch pan from its use position to its storage position.
11. The method of claim 10 wherein said segments are rectangular in shape.

12. The method of claim 10 wherein at least one of said segments contains a handle for displacing said segments.

13. The method of claim 10 wherein said spill source comprises rail cars and said frames are mounted to railroad ties between the railroad track.

14. The method of claim 10 wherein said spill catch pan is constructed from metal.

* * * * *